US010975617B2

(12) United States Patent
Nicolosi et al.

(10) Patent No.: US 10,975,617 B2
(45) Date of Patent: Apr. 13, 2021

(54) INSULATED GLAZING UNITS AND METHODS OF ASSEMBLING SUCH INSULATED GLAZING UNITS

(71) Applicant: Finglas S.r.l., Trento (IT)

(72) Inventors: Giovanni Nicolosi, Dresano (IT); Massimo Furlini, Trento (IT)

(73) Assignee: FINGLAS S.R.L., Trento (IT)

( * ) Notice: Subject to any disclaimer, the term of this patent is extended or adjusted under 35 U.S.C. 154(b) by 0 days.

(21) Appl. No.: 16/688,705

(22) Filed: Nov. 19, 2019

(65) Prior Publication Data
US 2020/0123841 A1    Apr. 23, 2020

Related U.S. Application Data

(62) Division of application No. 15/779,985, filed as application No. PCT/IB2016/056888 on Nov. 16, 2016.

(30) Foreign Application Priority Data

Dec. 2, 2015 (IT) .......................... 102015000079252

(51) Int. Cl.
E06B 9/264       (2006.01)
E06B 9/42        (2006.01)
E06B 3/663       (2006.01)

(52) U.S. Cl.
CPC .......... *E06B 9/264* (2013.01); *E06B 3/66309* (2013.01); *E06B 3/66328* (2013.01); *E06B 9/42* (2013.01); *E06B 2009/2643* (2013.01)

(58) Field of Classification Search
CPC ............. E06B 9/264; E06B 2009/2643; E06B 2009/2646; F16B 13/0808
See application file for complete search history.

(56) References Cited

U.S. PATENT DOCUMENTS 1,139,337 A * 5/1915 Brown ................ F16B 13/0808
                                          411/341
1,600,034 A * 9/1926 Brenizer ............. F16B 13/0808
                                          411/346

(Continued)

FOREIGN PATENT DOCUMENTS

EP        2764191 B1     12/2015

OTHER PUBLICATIONS

International Search Report and Written Opinion dated Jan. 24, 2017, in PCT Application No. PCT/IB2016/056888, 12 pages.

*Primary Examiner* — Katherine W Mitchell
*Assistant Examiner* — Abe Massad
(74) *Attorney, Agent, or Firm* — MH2 Technology Law Group, LLP

(57) ABSTRACT

The present disclosure concerns an insulated glazing unit (1). The insulated glazing unit (1) comprises a first glass pane (2), a second glass pane (3), a spacer element (4) comprising a first surface (5) designed for coupling with said first glass pane (2) and a second surface (6) designed for coupling with said second glass pane (3), said spacer element (4) being made of a low heat conductivity material, support means (7) within the insulated glazing system, for a blind (8), a screen or the like. The insulated glazing unit (1) is characterized said engagement means (12) comprise clamping means (12') comprising a head end (12A) and a tail end (12B) which are interconnected by a shaft (12C), wherein said head end (12A) comprises a countersunk head and said bottom end (12B) comprises ratchets that are configured to move from a deployed position to a retracted position.

19 Claims, 8 Drawing Sheets

(56) References Cited

U.S. PATENT DOCUMENTS

| | | | | |
|---|---|---|---|---|
| 2,068,243 | A * | 1/1937 | McLaughlin, Jr. | E06B 7/10 |
| | | | | 160/26 |
| 2,771,262 | A * | 11/1956 | Laystrom | F16B 13/0808 |
| | | | | 248/489 |
| 4,537,004 | A * | 8/1985 | Anderson | E06B 9/264 |
| | | | | 49/64 |
| 5,600,920 | A * | 2/1997 | Roy | E06B 9/264 |
| | | | | 160/107 |
| 6,119,756 | A * | 9/2000 | Tatro | E06B 9/264 |
| | | | | 160/107 |
| 6,748,709 | B1 * | 6/2004 | Sherman | E04B 2/96 |
| | | | | 52/235 |
| 7,234,501 | B1 | 6/2007 | Park | |
| 2005/0153517 | A1 * | 7/2005 | Kim | E06B 9/323 |
| | | | | 438/396 |
| 2014/0246155 | A1 * | 9/2014 | Nicolosi | E06B 3/66319 |
| | | | | 160/107 |
| 2015/0292258 | A1 * | 10/2015 | Pellini | B32B 17/064 |
| | | | | 428/34 |
| 2020/0208466 | A1 * | 7/2020 | Lee | E06B 9/30 |

* cited by examiner ional application of U.S. patent
INSULATED GLAZING UNITS AND METHODS OF ASSEMBLING SUCH INSULATED GLAZING UNITS

CROSS-REFERENCE TO RELATED APPLICATION(S)

This application is a divisional application of U.S. patent application Ser. No. 15/779,985 ("the '985 application"), filed on May 30, 2018, in the U.S. Patent and Trademark Office ("USPTO"), and published as U.S. Patent Publication No. 2018/0355658 A1 on Dec. 13, 2018. The '985 application was a national stage entry from International Application No. PCT/IB2016/056888 ("the '888 application"), filed on Nov. 16, 2016, in the Receiving Office ("RO/IB") of the World Intellectual Property Organization ("WIPO"), and published as International Publication No. WO 2017/093837 A1 on Jun. 8, 2017. The '888 application claimed priority under 35 U.S.C. § 119 from Italian Patent Application No. 102015000079252, filed on Dec. 2, 2015, in the Italian Patent and Trademark Office ("IPTO"). The entire contents of all of these applications are incorporated herein by reference.

FIELD OF THE INVENTION

The present disclosure relates to an insulated glazing unit as defined in the preamble of claim 1.

More in detail, the present disclosure concerns an insulated glazing unit having a spacer element and/or screens and/or blinds or other similar elements, and the method of assembling the insulated glazing system.

Discussion of the Related Art

In the manufacture of insulated glazing units, the need is strongly felt to reduce the time required to produce an insulated glazing unit and to make assembly operations by the personnel less prone to errors.

More in detail, the time required to set up an insulated glazing unit must be minimized, provided that the basic requirements of the insulated glazing unit are met, i.e.:

minimizing emissions of gases in the insulated glazing unit to the atmosphere and providing a seal against penetration of moisture from the atmosphere into the insulated glazing unit.

An insulated glazing unit usually comprises a frame composed of one or more spacer elements, which are mounted to the sides of the chamber defined by two glass panes, to maintain the latter in spaced relationship and prevent gas leakage along the edges.

The spacer elements are either connected by appropriate corner elements or formed as a single element folded into a closed frame.

Spacer elements with low linear heat transfer coefficients, known as "Warm Edge" are already available and have the purpose of supporting the insulated glazing unit and also of acting as supports for elements such as screens, blinds or the like, to be installed within the insulated glazing unit.

For example, EP 2764191 discloses a spacer element that allows fixation of screens, blinds and the like within the insulated glazing unit.

Prior Art Problem

Nevertheless, while the insulated glazing unit of EP 2764191 meets all design requirements for insulated glazing units, the fixation of screens, blinds and the like within the insulated glazing unit still requires skilled personnel, as well as operations that might damage, in certain cases, the spacer element and/or the support element.

Furthermore, the special movements that the personnel is required to perform to fix the screens, blinds and the like to the spacer element increase manufacturing times, which will reflect on higher costs for the manufacturer and, as a result, for the final user.

SUMMARY OF THE INVENTION

The object of the present invention is to provide an insulated glazing unit and an associated assembly method that allow quicker and more efficient fixation of screens, blinds and the like to the spacer element within the insulated glazing unit, with the same reliability as prior art insulated glazing units.

This object is fulfilled according to the invention by an insulated glazing unit as defined in claim 1.

Advantages of the Invention

In one embodiment, an insulated glazing unit is provided, which can minimize emissions of the gases in the insulated glazing unit to the atmosphere and provide a seal against penetration of moisture into the insulated glazing unit.

Also, the present invention provides a method of manufacturing an insulated glazing unit that is quicker and more efficient than prior art methods, while ensuring compliance with the other design specifications.

BRIEF DESCRIPTION OF THE DRAWINGS

The characteristics and advantages of the present disclosure will appear from the following detailed description of a possible practical embodiment, illustrated as a non-limiting example in the set of drawings, in which.

DETAILED DESCRIPTION

Figure 1:
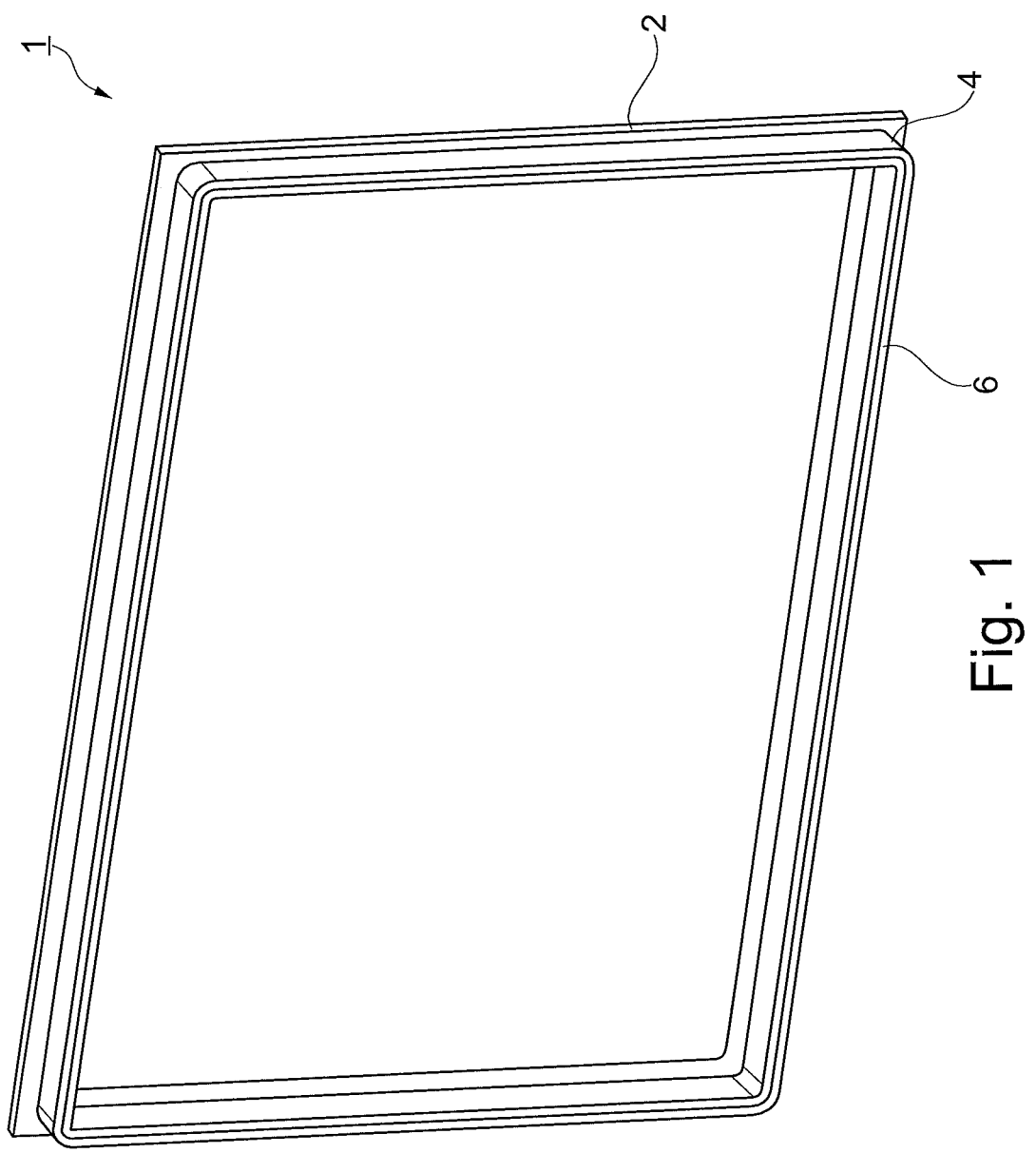
FIG. 1 shows an axonometric view of the insulated glazing unit during an assembly step, including a spacer element and with a glass pane removed.

Referring to the accompanying figures, numeral 1 generally designates an insulated glazing unit comprising a first glass pane 2 and a second glass pane 3 (FIGS. 5 and 6), and a spacer element 4 to define a so-called insulated glazing unit.

As used herein, the term insulated glazing unit is intended to designate a substantially hermetically sealed volume, which is designed to contain:

devices for driving the movement of the blind, screen or the like, including the mechanical, electrical, electronic elements required for driving the movement of the blind, screen or the like air or more preferably noble gases such as argon or krypton, which are characterized by lower heat transfer coefficients as compared with air, for significant enhancement of thermal insulation.

The insulated glazing unit 1 as shown in the accompanying figures is designed to be mounted to a frame which is in turn adapted to be placed in a wall of a building.

As used hereinafter, the term "interior of insulated glazing unit" relates to the insulated glazing unit 1 as installed, therefore the term "interior of the insulated glazing unit" shall be intended as the closed volume that is defined by the two glass panes at the sides, and by the spacer element above and below, with the terms above and below relating to the lying plane, i.e. the plane in which the insulated glazing unit is installed.

The spacer element 4 comprises a first surface 5 designed for coupling with the first glass pane 2 and a second surface 6 designed for coupling with the second glass pane 3.

The first surface 5 and the second surface 6 are parallel and preferably opposite to each other.

In a preferred aspect of the present disclosure, the spacer element 4 is made of a low heat conductivity material, such as natural or synthetic rubber.

This will provide a spacer element 4 characterized by a low linear heat transfer coefficient, which will reduce the emission of gas to the atmosphere at the peripheral frame, i.e. where the spacer 4 is mounted.

In other embodiments, the material of the spacer element 4 may comprise silicone foam and/or the like, or any other commercially available material having similar properties.

Figure 2:
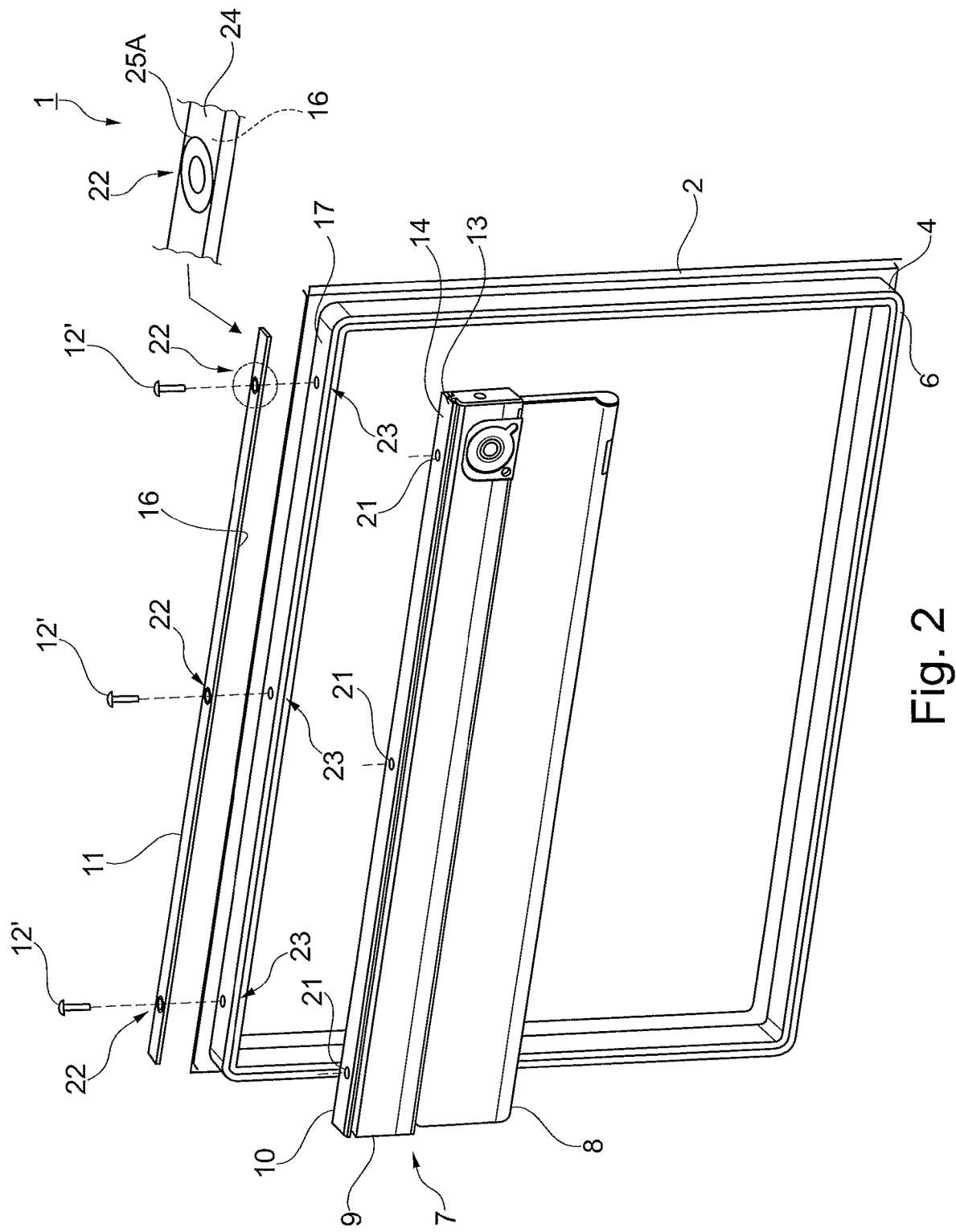
FIG. 2 shows an axonometric view of the insulated glazing unit of FIG. 1 during another assembly step, including a box and two profiles.
Figure 3:
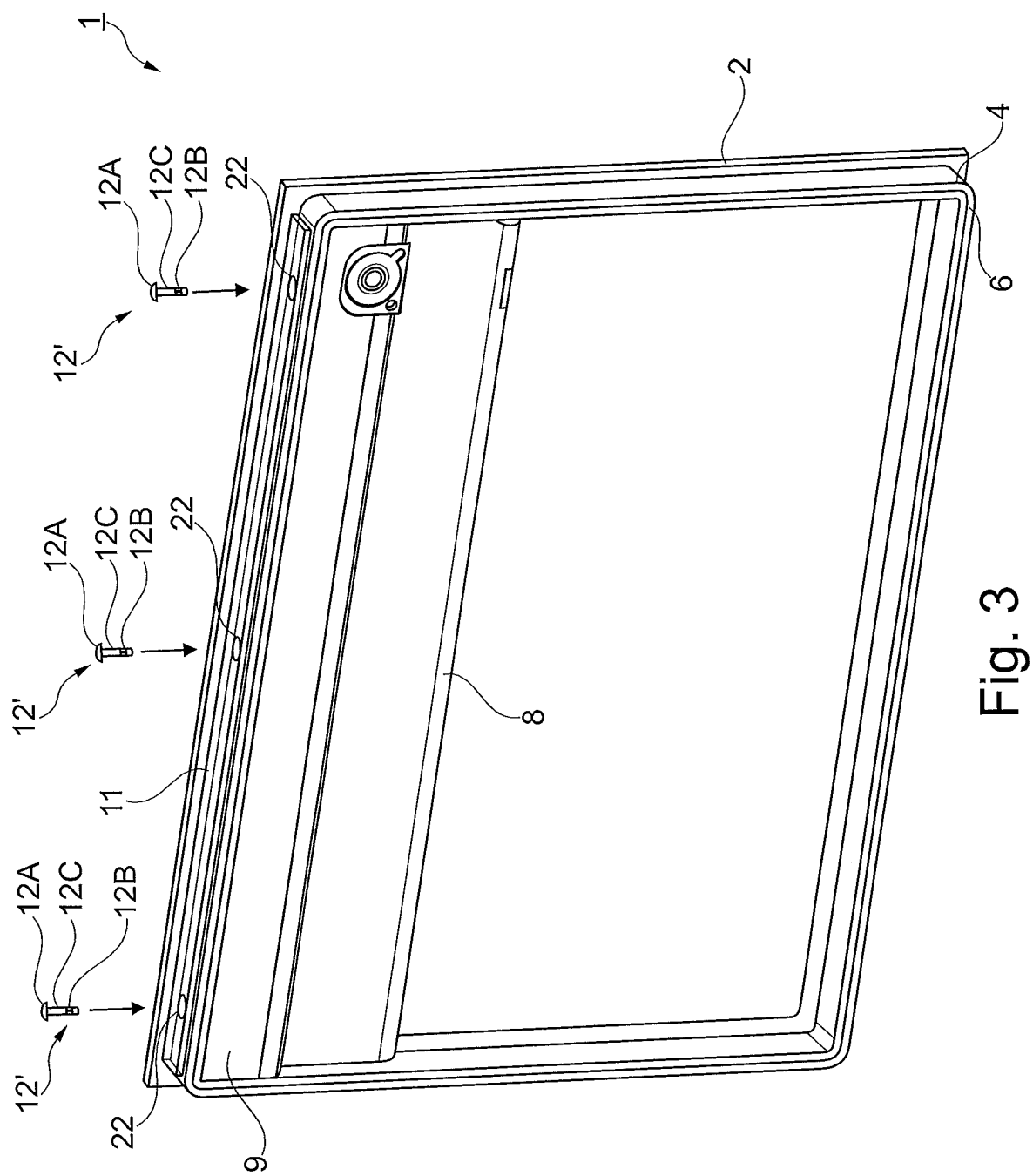
FIG. 3 shows an axonometric view of the insulated glazing unit of FIG. 2 during a further assembly step, including engagement means.

The insulated glazing unit 1 comprises support means, generally referenced 7, for supporting a blind 8, a screen or the like within the insulated glazing unit, as shown in FIG. 2.

The support means 7 consist of a blind assembly installed in the insulated glazing unit and comprise a support box 9 with the blind 8 associated therewith in a manner that is known in the art and will not be further described herein.

It shall be noted that, for the purposes of the present disclosure, the box 9 of the blind allows the blind to be fixed within the insulated glazing unit.

Figure 4A:
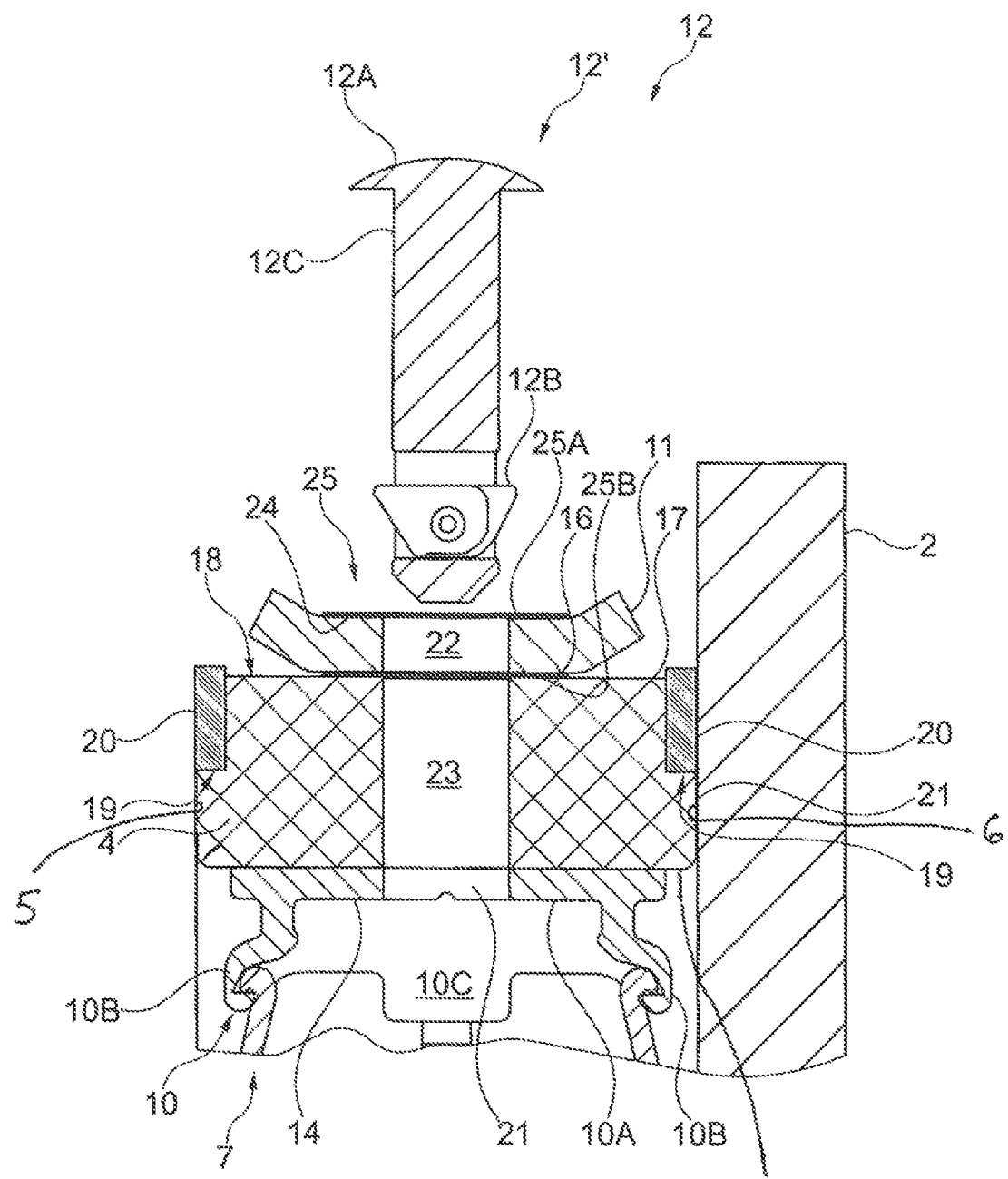
FIGS. 4A, 4B and 4C show a cross sectional view of the next assembly steps of the insulated glazing unit of FIG. 3.
Figure 4B:
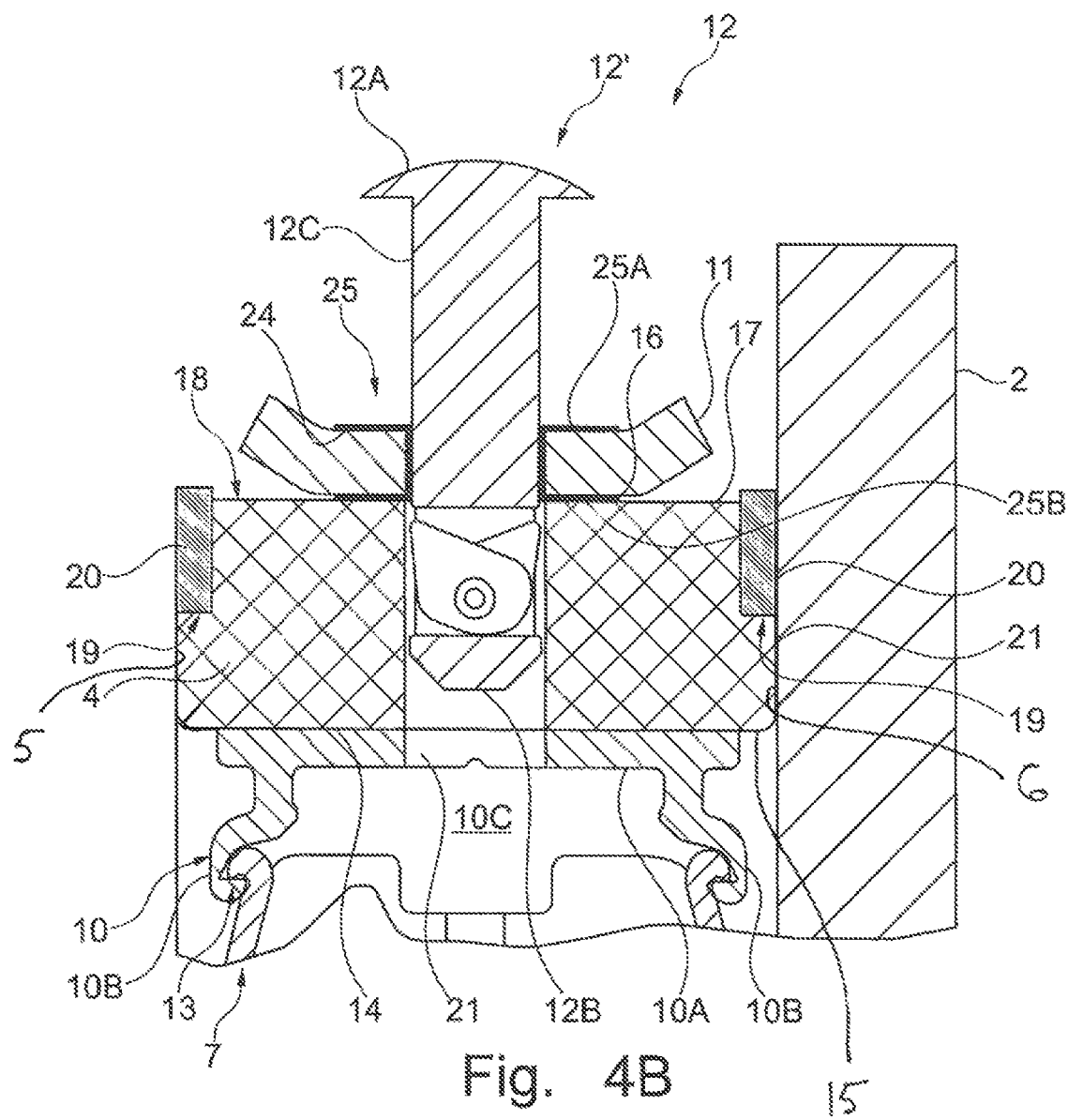
Figure 4C:
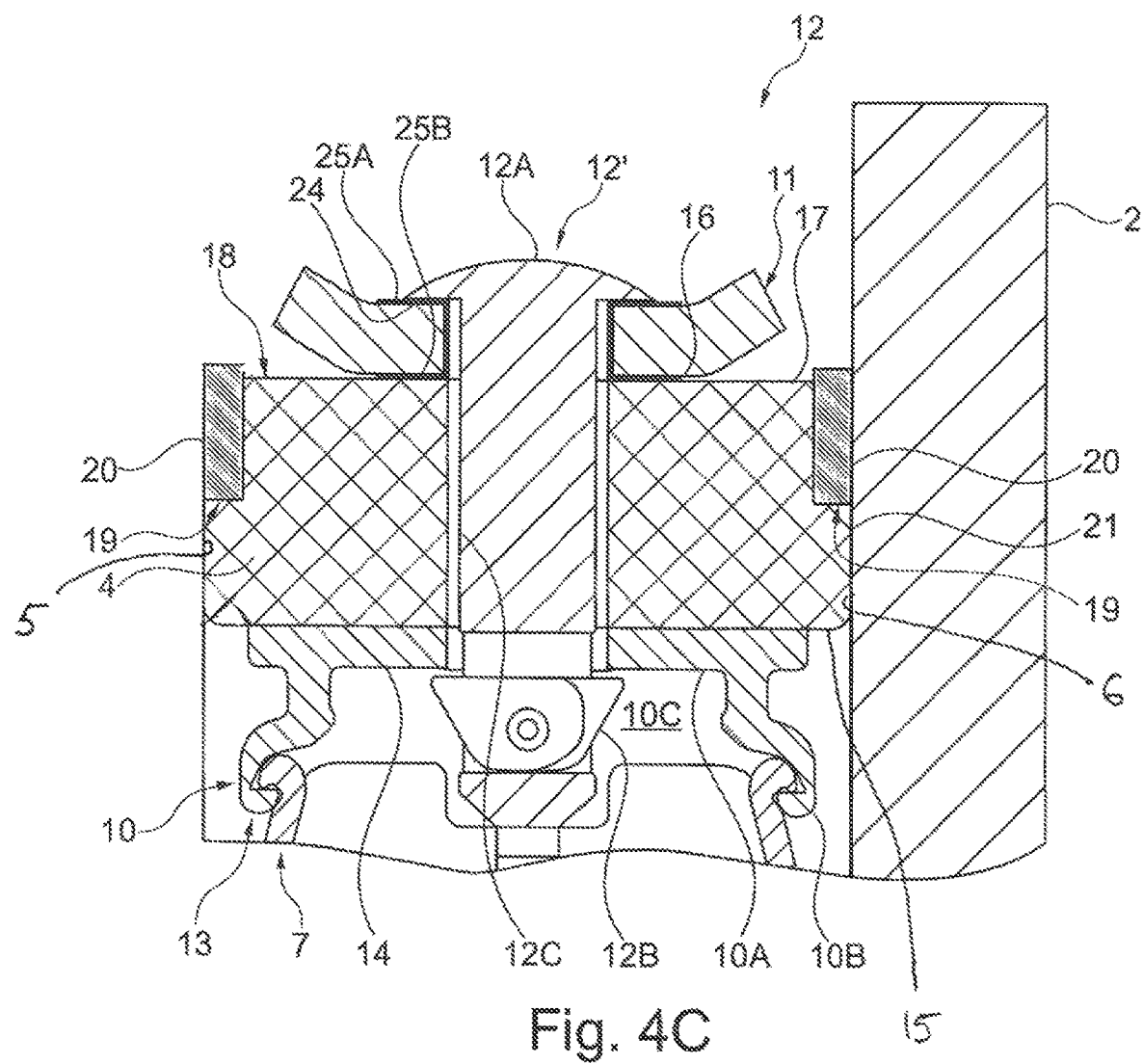

FIGS. 4A to 4C show that the spacer element 4 of the present embodiment comprises a multilayer barrier 18 as a gas and vapor barrier, which covers the outer surface of the spacer element.

The multilayer barrier 18 is formed as is known in the art, and is made, for instance, of a metal material, such as aluminum, or a multilayer material.

FIGS. 4A to 4C also show that the spacer element 4 of the present embodiment comprises lateral recesses 19 for receiving seals 20, typically made of butyl (isobutylene, isoprene, polyisobutylene) required in the assembly of the insulated glazing unit 1.

It shall be noted that the lateral recesses 19 are located proximate to the first surface 5 and the second surface 6 of the spacer element respectively.

Additional adhesive elements 20a may be provided at the sides of the spacer element 4, i.e. at the first surface 5 and the second surface 6 of the spacer element 4.

The spacer element 4 of the present embodiment comprises, as is known in the art, desiccants such as salts and the like, incorporated therein.

In one aspect of the present disclosure, also referring to FIG. 2, the insulated glazing unit 1 comprises a first profile 10 and engagement means 12 and, in a preferred embodiment thereof also a second profile 11.

Such preferred embodiment of the present disclosure, i.e. the one with the second profile 11, will be now described.

Particularly, also referring to FIGS. 4A to 4C, the first profile 10 comprises a first surface 13 designed for coupling with the support means 7 and a second surface 14 designed for coupling with bottom surface 15 of the spacer element 4.

Particularly, the second profile 11 comprises a first surface 16 designed for coupling with a top surface 17 of the spacer element 4.

The bottom surface 15 and the top surface 17 of the spacer element 4 are parallel and preferably opposite to each other.

In one aspect, the first surface 5 and the second surface 6 extend substantially perpendicular to the bottom surface 15 and the top surface 17 of the spacer element 4.

Particularly, also referring to the cross-sectional views of FIGS. 4A to 4C, it can be noted that the first profile 10 is internal to the insulated glazing unit 1, and the second profile 11 is external to the insulated glazing unit 1, such that they will be opposite to each other on each side of the spacer element 4. Particularly, the first profile 10 is coupled to the bottom surface 15 of the spacer element 4, and the second profile 11 is coupled to the top surface 17 of the spacer element 4.

In one aspect of the present disclosure, the first profile 10, the second profile 11 and the spacer element 4 have each at least one through hole 21, 22 and 23 respectively.

In the preferred embodiment, the first profile 10 the second profile 11 and the spacer element 4 comprise each a plurality of through holes, which are shown in the accompanying figures as a series of three holes for each element.

Preferably, the holes 21, 22 and 23 have identical sizes and cross-sections and, in a preferred embodiment, are through holes with circular cross-sections.

These through holes 21, 22 and 23 of the first profile 10, the second profile 11 and the spacer element 4 respectively are coaxially formed, which means that when said first profile 10, second profile 11 and spacer element 4 are assembled, the holes 21, 22 and 23 are in such positions that their axes of symmetry are coaxial.

In one aspect, the engagement means 12 engage said through holes 21, 22 and 23 to create a tight mechanical coupling between the spacer element 4 and the first profile 10 and the second profile 11.

Particularly, the coupling created by the engagement means 12 will provide both a firm mechanical coupling and an effective seal against gas leakage from the insulated glazing unit as well as against penetration of moisture from outside the insulated glazing unit between the spacer element 4 and the first profile 10 and the second profile 11.

It shall be noted that the first profile 10 comprises a substantially flat central portion 10A having two wings 10B extending therefrom. Particularly, the two wings 10B define a cavity 10C, i.e. a volume, between the top end of the box 9 and the surface that is coupled to the support means 7.

In one aspect, each of the free tail ends of the two wings 10B comprise a portion that is specially shaped to create a form-fit with the upper profile of the box 9 to ensure mechanical engagement between the free tail ends of the two wings 10B and the upper profile of the box 9.

It shall be further noted that the first surface 16 of the second profile 11 (i.e. the surface designed for coupling with the top surface 17 of the spacer element 4) is complementary to the surface 17 of the spacer element 4.

In the embodiment as shown in the accompanying figures, the surface 16 and the top surface 17 of the spacer element 4 are substantially flat.

Conversely, the second surface 24 of the second profile 11 has an open shape. Particularly, in the central area it extends substantially parallel to the first surface 16, whereas the end or peripheral areas are flared, i.e. extend in a direction transverse to the central area.

In one aspect, the first profile 10 and the second profile 11 are made of a rigid material. For example, these profiles 10 and 11 may be preferably made of aluminum or any other material having suitable properties for the application.

Assuming that aluminum is used as a material for the first and second profiles 10, 11, the linear cross-section (width) of the first profile 10 and the second profile 11 will be smaller than the distance between their respective glass panes 2 and 3.

Particularly, the width of the first and second profile 10, 11 is smaller than the distance between the respective mutually facing inner surfaces of the first and second glass panes 2 and 3, which means that the first profile 10 and the second profile 11 do not contact the two glass panes 2 and 3.

Such smaller distance ensures that no thermal bridge will be created between the glass panes 2 and 3 and the profiles 10, 11.

The first profile 10, as shown in FIG. 2, in a preferred embodiment, extends along the entire linear and/or surface extent of the box 9 to overlap or cover its top surface.

Alternatively, the first profile 10 may be composed of multiple profile sections or lengths. Here, each profile section or length would comprise at least one through hole.

The second profile 11, as shown in FIG. 2, in a preferred embodiment, extends along the entire linear and/or surface extent of the top surface 17 of the spacer element 4.

Advantageously, by extending along the entire linear extent of the top surface 17 of the spacer element 4, the second profile 11 will be able to distribute the weight of the support means 7 and the blind 8, through the engagement means 12, over a larger support surface.

Referring to FIGS. 4A to 4C, it will be noted that the engagement means 12 comprise sealing means 25 having a first sealing ring 25A and a second sealing ring 25B, each being placed proximate to the through hole (or through holes) 22, to provide a seal between the spacer element 4 and the second profile 11.

In other words, the first sealing ring 25A and the second sealing ring 25B are placed on the first surface 16 and the second surface 24 respectively of the second profile 11 proximate to the through hole/s 22.

According to one embodiment, the sealing ring 25A or 25B is made of butylene (isobutylene, isopropene, polyisobutylene).

The sealing ring 25A or 25B has a thickness ranging from 0.5 mm to 2 mm, preferably of 1 mm.

In one aspect the engagement means 12 comprise fastener means 12' having a head end 12A and a tail end 12B which are interconnected by a shaft 12C. Preferably, the head end 12A comprises a countersunk head and the bottom end 12B comprises ratchets that are configured to move from a deployed position to a retracted position.

As shown in FIGS. 4A to 4C, the head end 12A engages the surface 24 at the sealing ring 25A, whereas the shaft 12C and the tail end 12B engage the sealing ring 25B. Particularly, as the shaft 12C and the tail end 12B fit into the through holes 22 and 23, a certain amount of the material of the aforementioned sealing rings 25A and 25B is dragged along against the walls of the through holes 22 and 23, thereby providing a seal against leakage of gases in the insulated glazing unit and against penetration of moisture into the insulated glazing unit.

Furthermore, the tail end 12B of the fastener means 12' engages the surface 13 of the first profile 10 to thereby create a seal and ensure mechanical engagement.

Alternatively, the fastener means 12' may consist of screws, rivets or the like.

The insulated glazing unit 1 comprises control means 26 and an associated cord-puller 26A to control the movement of the blind 8.

Figure 6:
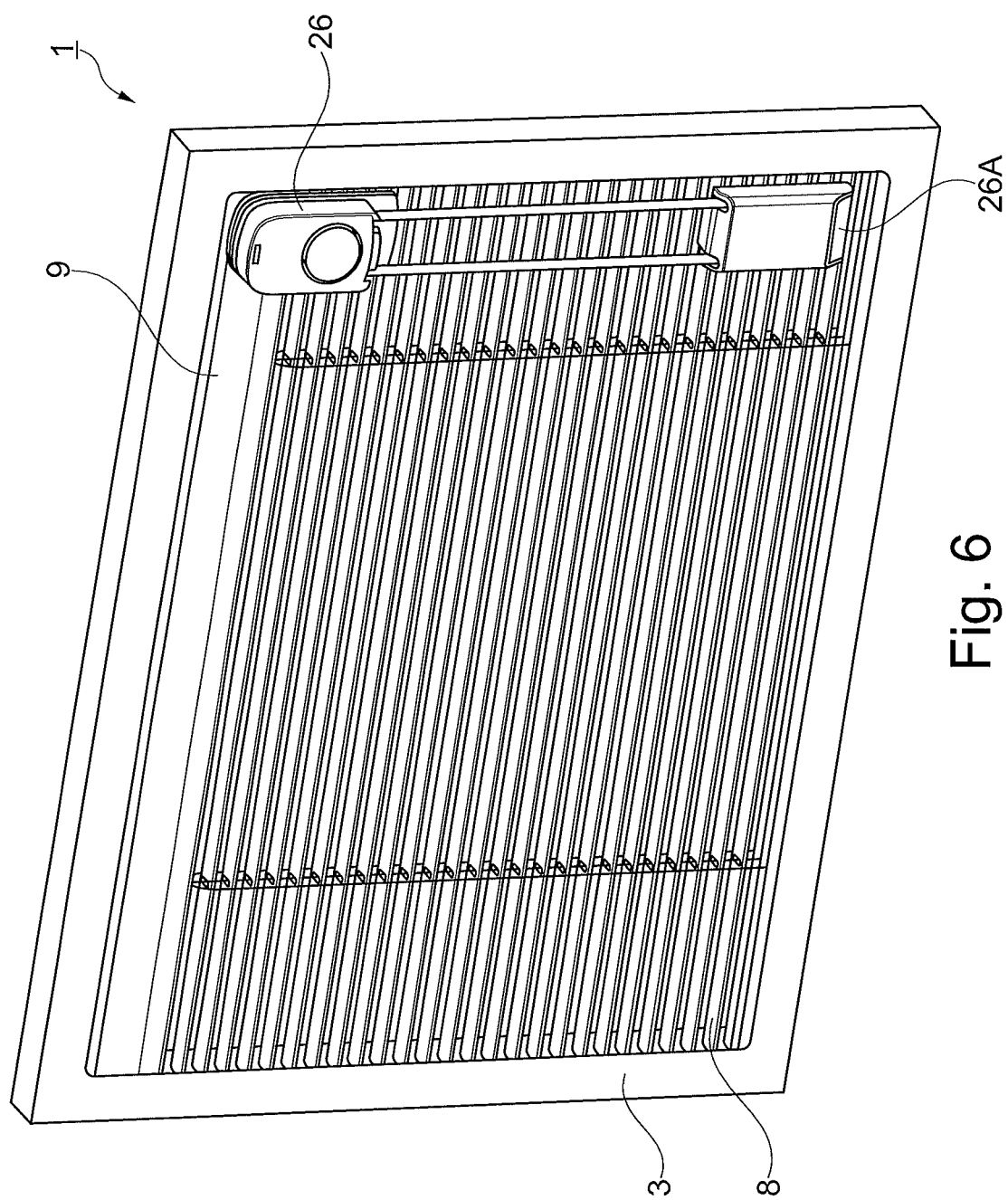
FIG. 6 shows an axonometric view of the insulated glazing unit of FIG. 5 during a further assembly step, including control means.

In one aspect, as shown in FIG. 6, the control means 26 are associated with the glass pane 3 and the box 9 in a manner that is known in the art and will not be further described herein.

FIGS. 1 to 6 show various details and steps of the assembly of the insulated glazing unit 1 having the spacer element 4 and the profiles 10 and 11.

Particularly, FIG. 1 shows the insulated glazing unit 1 without the second glass pane 3 and without the blind 8 and associated box 9, with the profiles 10 and 11 removed from the spacer element 4, but with the latter already adhesively bonded to the glass pane 2.

As is shown, screen-printing may be applied to the perimeter end of the glass pane 2, as well as that of the glass pane 3, to block the perimeter light that might filtrate therethrough and allow the box 9 and the profiles 10 and 11 to be discerned.

Figure 5:
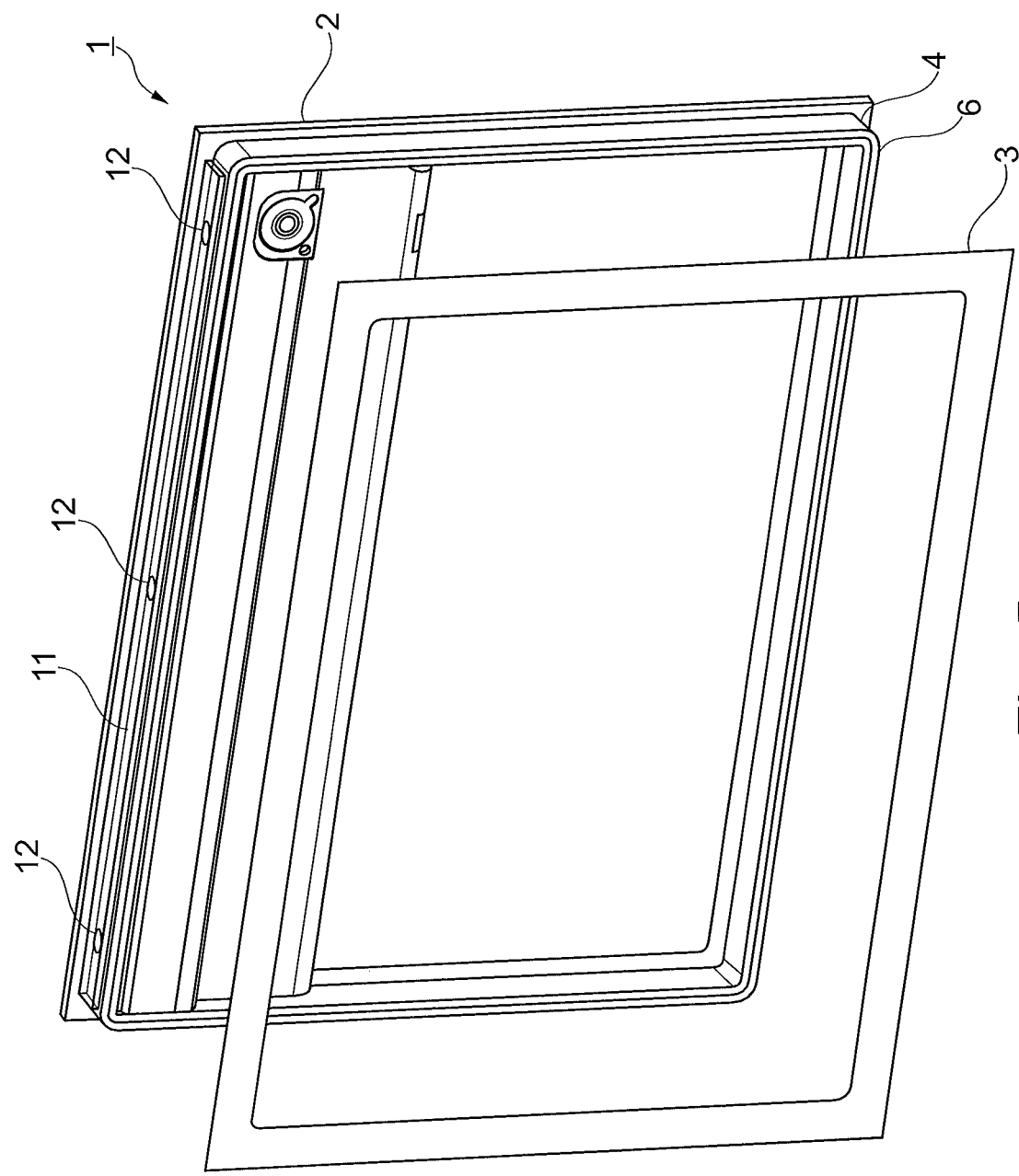
FIG. 5 shows an axonometric view of the insulated glazing unit of FIG. 3 during a further assembly step, including the other glass pane.

On the other hand, FIG. 5 shows the insulated glazing unit 1 in its assembled form, with the blind 8 mounted to the box 9 therein and the second glass pane 3 lifted for clarity.

FIG. 6 shows the insulated glazing unit 1 in its assembled form, with the blind 8 mounted to the box 9 therein and the spacer element 4 adhesively bonded to the glass pane 3 and equipped with control means 26.

As is clearly shown in FIG. 1, the insulated glazing unit 1 is preferably assembled using a single spacer element 4 in the form of a closed frame.

Nevertheless, sections of appropriate lengths might also be used.

In the preferred embodiment, the first profile is placed along the bottom side of the spacer element 4, and the second profile 11 is placed along the top side.

These profiles 10 and 11 engage the spacer element 4 through engagement means 12. Particularly, the fastener means 12' extend through the through holes 21, 22 and 23 to ensure mechanical engagement and the sealing means 25 provide the sealing action.

Alternatively, only the first profile 10 may be possibly used, with the fastener means 12' of the engagement means 12 extending through the through holes of the spacer element 4 and the first profile 10 only.

The insulated glazing unit 1 with the spacer element 4, the first and second profiles 10 and 11 and the engagement means, is assembled according to the present disclosure as follows.

In one step, the spacer element 4, which preferably already has adhesive elements 20a and seals 20 on both of its surfaces 5 and 6, is attached, as is known in the art, to the first glass pane 2 of the insulated glazing unit 1, as shown in FIG. 1, so that a closed frame is formed from a single length of spacer element 4.

In a preferred aspect, before adhesion to the glass 2 the spacer element 4 has been punched for a through hole (or the series of through holes) 23 to be formed therein.

Alternatively, the spacer element 4 may be punched with such spacer element 4 already adhesively bonded to the glass pane 2.

Later, as shown in FIG. 2, the spacer element 4 is associated at its bottom side with the first profile 10, that has been coupled beforehand to the support means 7, and at its top side with the second profile 11.

In a preferred embodiment, the first and second profiles 10 and 11 have been blanked beforehand for at least one through hole (or the series of through holes) 21 and 22 to be formed there through respectively.

Preferably the first and second profiles 10, 11 are blanked in a single step, i.e. by simultaneously blanking both the first and the second profiles 10, 11. This will ensure that the series of through holes formed in the first profile 10 will have the same center-to-center spacing as that of the through holes formed in the second profile 11.

In one aspect of the assembly, the sealing means 25 are placed proximate to the through hole/s 22 of the second profile 11 and the fastener means 12' are fitted into these through holes.

Then the through holes 21, 22 and 23 are mechanically engaged by the fastener means 12', with the latter projecting out of the second profile 11.

Particularly, the tail end 12B fits into the through hole 22 of the second profile 11, extends through the through hole 23 of the spacer element 4 and comes out of the through hole 21 of the first profile 10, where it engages with the first surface 13 of the first profile 10 to fasten the first profile 10 and the second profile 11 to the spacer element 4.

Therefore, the fastener means 12' act as guide elements when coupling the various components, to ensure that the through holes will be coaxial.

The second glass pane 3 will be finally attached to the spacer element 4 by means of adhesive elements 20a and seals 20.

The description clearly shows that the invention so conceived provides important technical advantages.

First, the spacer element 4 affords all the advantages that can be obtained with conventional "warm edge" units, in terms of reduced emissions to the outside, i.e. power savings, as well as the possibility of simply, quickly, safely and cost-effectively mount any blind, screen or the like in the insulated glazing unit.

Those skilled in the art will obviously appreciate that a number of changes and variants may be made to the above described insulated glazing unit and associated assembly method, to fulfill particular requirements, without departure from the scope of the invention, as defined in the following claims.

The invention claimed is:

1. An insulated glazing unit, comprising:
a first glass pane,
a second glass pane,
a solid spacer element surrounding an internal volume of the insulated glazing unit between the first glass pane and the second glass pane, the solid spacer element comprising a first surface configured to couple with said first glass pane, a second surface configured to couple with said second glass pane, an internal surface on an inner side of the solid spacer element, facing the internal volume, and an external surface on an outer side of the solid spacer element, outside the internal volume, said solid spacer element being made of an elastomeric or polymeric foam material,
support means within the insulated glazing unit for a blind or a screen,
a first profile and elongated engagement means,
said first profile comprising a first surface configured to couple with said support means and a second surface configured to couple with the internal surface of said solid spacer element,
each of said first profile and said solid spacer element has at least one through hole, the at least one through hole of the solid spacer element extending for a whole thickness of the solid spacer element, from the external surface to the internal surface, and
said elongated engagement means engaging said through holes to thereby provide a mechanical coupling between said solid spacer element and said first profile.

2. The insulated glazing unit of claim 1, wherein the solid spacer element is made of natural rubber, synthetic rubber, or silicone foam.

3. The insulated glazing unit of claim 1, wherein said elongated engagement means comprises a clamping means having two opposite end portions which are interconnected by a shaft which is thinner than the end portions, a first one of said end portions emerging outside the internal volume from said external surface of the solid spacer element, a second one of said end portions protruding inside the internal volume from said first surface of said first profile.

4. The insulated glazing unit of claim 3, wherein a cavity is defined between the first surface of the first profile and the support means, said second one of the end portions of the clamping means being arranged in said cavity.

5. The insulated glazing unit of claim 3, wherein said two opposite end portions comprise a head end having a countersunk head, and a tail end, having ratchets that are configured to move from a deployed position to a retracted position.

6. The insulated glazing unit of claim 1, wherein said elongated engagement means comprises sealing means comprising at least one sealing ring which is placed on said external surface of said solid spacer element, proximate to said at least one through hole of said solid spacer element.

7. The insulated glazing unit of claim 6, wherein said at least one sealing ring comprises butyl.

8. The insulated glazing unit of claim 3, wherein said elongated engagement means comprises sealing means comprising at least one sealing ring which is placed on said external surface of said solid spacer element, proximate to said at least one through hole of said solid spacer element, and
wherein a portion of the material of the at least one sealing ring is dragged along by the clamping means against walls of said at least one through hole of the solid spacer element.

9. The insulated glazing unit of claim 1, comprising a second profile comprising a first surface configured to couple with a top surface of said solid spacer element and at least one through hole, said elongated engagement means engaging said through holes of said first profile, said second profile, and said solid spacer element to thereby provide a mechanical coupling between said solid spacer element, said first profile, and said second profile.

10. The insulated glazing unit of claim 9, wherein said second profile comprises profile portions located proximate to the at least one through hole of the solid spacer element or that extend along an entire length of the top surface of said solid spacer element.

11. The insulated glazing unit of claim 9, wherein:
said first surface of the second profile is a substantially flat surface, and a second surface of the second profile comprises a central area extending substantially parallel to said first surface of the second profile, whereas the ends or peripheral areas are flared.

12. The insulated glazing unit of claim 9, wherein a transverse linear dimension of said first profile and said second profile is smaller than a distance between said first and second glass panes.

13. The insulated glazing unit of claim 9, wherein said elongated engagement means comprises sealing means comprising a first sealing ring and a second sealing ring which are placed on a second surface and on said first surface of said second profile respectively, proximate to said at least one through hole, to provide a seal between said solid spacer element and said second profile.

14. The insulated glazing unit of claim 1, wherein said first profile extends along the entire length of the solid spacer element or at least along a portion of an entire length of said solid spacer element.

15. The insulated glazing unit of claim 14, wherein said first profile comprises a substantially flat central portion, with two wings extending therefrom, each comprising a rabbeted end portion.

16. The insulated glazing unit of claim 2, wherein said elongated engagement means comprises a clamping means having two opposite end portions which are interconnected by a shaft which is thinner than the end portions, a first one of said end portions emerging outside the internal volume from said external surface of the solid spacer element, a second one of said end portions protruding inside the internal volume from said first surface of said first profile.

17. The insulated glazing unit of claim 16, wherein a cavity is defined between the first surface of the first profile and the support means, said second one of the end portions of the clamping means being arranged in said cavity.

18. The insulated glazing unit of claim 16, wherein said two opposite end portions comprise a head end, having a countersunk head, and a tail end, having ratchets that are configured to move from a deployed position to a retracted position.

19. The insulated glazing unit of claim 16, wherein said elongated engagement means comprises sealing means comprising at least one sealing ring which is placed on said external surface of said solid spacer element, proximate to said at least one through hole, and wherein a portion of the material of the at least one sealing ring is dragged along by the clamping means against walls of said at least one through hole of the solid spacer element.

* * * * *